United States Patent [19]
Jones

[11] Patent Number: 5,376,020
[45] Date of Patent: Dec. 27, 1994

[54] CANOPY FOR AN EXIT LIGHT

[76] Inventor: John E. Jones, 40350 Republic, Sterling Heights, Mich. 48313

[21] Appl. No.: 22,066

[22] Filed: Feb. 24, 1993

[51] Int. Cl.$^5$ .............................. H01R 13/73
[52] U.S. Cl. .................... 439/537; 362/147; 362/812; 220/338
[58] Field of Search .............. 220/3.8, 338; 248/343; 439/537, 534–536, 529; 362/812, 404, 147

[56] References Cited

U.S. PATENT DOCUMENTS

| | | | |
|---|---|---|---|
| 2,094,446 | 9/1937 | Clement | 220/338 |
| 2,330,975 | 10/1943 | Jackson | 220/338 |
| 2,460,488 | 2/1949 | Brunetti | 220/338 |
| 2,765,949 | 10/1956 | Hillman | 220/338 |
| 4,199,803 | 4/1980 | Hunt, III | 362/263 |
| 4,222,093 | 9/1980 | Garcia et al. | 362/147 |
| 4,300,190 | 11/1981 | Mershon | 362/404 |
| 4,368,506 | 1/1983 | Rapp | 362/147 |

Primary Examiner—Gary F. Paumen
Attorney, Agent, or Firm—Remy J. VanOphem

[57] ABSTRACT

A method and apparatus for use in connecting a fixture, such as an exit sign, to an electric box in a ceiling. The apparatus is a two-piece canopy, an upper portion of which is connected to the electric box in the ceiling and a lower portion of which is connected to the exit sign. The lower portion and exit sign are then connected to the upper portion through the use of dimple-socket fittings in the sides of the upper and lower portions of the canopy. The wires are then connected together and the two-piece canopy is closed and secured shut.

13 Claims, 2 Drawing Sheets

CANOPY FOR AN EXIT LIGHT

BACKGROUND OF THE INVENTION

1. Field of the Invention

The present invention relates to an apparatus and method for mounting a fixture to an electric box in a ceiling. More particularly, the present invention relates to a detachable two-piece canopy, for mounting an exit sign to the ceiling, which is usable so that one piece of the canopy is mounted to the ceiling while the second piece of the canopy is mounted to the exit sign with provisions to separately depend from the ceiling mounted piece while the electrical connections are made.

2. Description of the Prior Art

In the context of commercial office buildings and other types of commercial buildings there is generally a large number of exit signs and other lighting fixtures that require installation during construction. In this environment, the prior art one-piece canopy would, prior to installation to the ceiling fixture, be fastened to the exit sign housing using a screw or bolt type fastener. The wires of the exit sign are pulled through an appropriate opening in the canopy into the interior of the canopy. A ceiling fixture plate is attached to the electrical outlet box in the ceiling using a fastener and the ceiling wires are pulled through a hole in the ceiling fixture plate. Typically, exit signs in these environments are installed with great difficulty in that the installer must stand on a ladder and with one arm elevate an exit sign with a single piece canopy attached thereto and then with the remaining free hand attempt to attach the electrical wiring prior to securely mounting the sign to a standard ceiling fixture plate mounted in the ceiling.

Exit signs, however, are relatively heavy because they have a battery back-up which can continue to light the exit sign after the power to the exit sign is cut off. Since the exit sign is so heavy and because a one-piece canopy is used, one person must connect the exit sign to the ceiling at great risk of injury, i.e., falling from the ladder or accidentally dropping the fixture in an effort to maintain balance on the ladder. Alternatively, the exit sign may be set on a convenient surface, i.e., the top of the ladder, providing the ceiling wires and/or exit fixture wires are sufficiently long to permit this procedure. Once the wires are connected, they are folded and set inside of the canopy and the canopy is then connected to the ceiling fixture plate in the ceiling from which the exit sign will suspend.

Thus, the above-mentioned prior art canopy for exit signs requires either a balancing act by the installer, an extra person to hold the exit sign, or a surface near the ceiling on which to set the exit sign while the wires of the exit sign and the ceiling wires are being spliced together. Thus, the prior art canopy used on exit signs is not cost effective to install because the installation is not safety conscious and it is time consuming and burdensome. Further, the same disadvantages are experienced each time any maintenance is performed on an exit sign using the prior art canopy.

To avoid these disadvantages, some solutions have been developed for mounting fixtures to a ceiling or wall. Many of these improvements are directed to the desirability of providing a means for mounting a light fixture without the aid of a second person.

U.S. Pat. No. 4,199,803 to Hunt is an example of an assembly and method for mounting a mercury vapor floodlight fixture to a bracket in the ceiling. Hunt discloses a double-ended hook member that has one end connected to a hole in a bracket connected to the ceiling, and the other end of the hook connected to a hole in the side of the flood light fixture housing so that the housing may be suspended from the bracket member while the electrical connections are made. However, after the electrical connections are made the hook must be removed before the fixture can be guided onto the ceiling bracket and attached thereto. Also, unless a fixture and ceiling bracket have a hole to accommodate the end of the hook, this solution cannot be used.

Similarly, U.S. Pat. Nos. 4,368,506, to Rapp; 4,300,190, to Mershon; and 4,222,093, to Garcia, et al, teach devices that can be used to mount a lighting fixture to a ceiling or wall and will provide a means for suspending the lighting fixture in an open position while the wires are being connected. However, in each case special ceiling brackets must be used to accommodate the features of the invention and such brackets are expensive.

U.S. Pat. No. 4,368,506 to Rapp teaches the use of a base connected to the ceiling and a bracket mounted to a luminaire. Rapp discloses that the bracket has a pair of upwardly extending members which are adapted to mount to side portions which are connected to the base. The upwardly extending members have a complex arrangement of slots which are adapted to receive posts which are connected to the base. The slots are aligned in a novel arrangement to provide a means for hanging the luminaire while the electrical connections are being made, and to then provide a means for supporting the luminaire while in a closed position. Thus, Rapp teaches a novel arrangement of slots and associated posts in order to achieve its primary object of hanging a luminaire from a bracket while the electrical connections are being made. However, Rapp's solution is very expensive to manufacture and is unsightly.

U.S. Pat. No. 4,222,093, to Garcia et al., teaches a quick connect and detach light fixture which includes a back plate adapted to be secured to a wall and a fixture supporting plate, preferably by means of an opening associated with the back plate and a corresponding complemental pivot pin secured to the fixture supporting plate. This combination is expensive to manufacture and could result in the fixture accidentally unhooking from the back plate while the wires are electrically connected.

U.S. Pat. No. 4,300,190, to Mershon, teaches a special purpose T-shaped bracket which is attached to the intended mounting surface. A mating plate designed to engage the T-shaped bracket attaches to the lighting fixture. The T-shaped bracket permits the fixture to hang therefrom while the electrical connections are being made. Note, however, that the need for a special T-shaped bracket and associated plate makes this solution expensive and impossible to adapt to the current standard ceiling fixture plates that are used in industry today.

The above-referenced patents disclose devices for use in mounting a light fixture to a ceiling or wall. However, they all differ markedly from the present invention. For example, U.S. Pat. No. 4,199,803 to Hunt merely teaches the use of a thin piece of wire, a double-ended hook member, inserted into holes in a bracket and the fixture and used to suspend the fixture from the bracket; and U.S. Pat. No. 4,368,506 to Rapp teaches the use of a three-slot mounting system to achieve its desired object. Further, the above devices do not provide a large amount of security and safety for these types of apparatuses. In particular, the prior art devices are either very complicated and expensive to manufacture or unsafe because they do not completely conceal the wires or they are difficult to use because they require a large amount of manipulation. Accordingly, what is needed is a canopy which is adapted to be mounted to the present ceiling plate, is inexpensive to manufacture, and provides for safe installation of an exit sign to a ceiling plate.

SUMMARY OF THE INVENTION

The present invention relates to an improved apparatus and method for mounting an exit sign to a standard electric box mounted in a ceiling or wall. The apparatus is a canopy made up of two pieces—an upper portion which connects to the electric box in the ceiling, and a lower portion detachable from the upper portion which connects to the exit sign. Both portions are snapped together and are adapted to pivot with respect to each other so that the electrical connections can be safely made.

The upper portion and the lower portion of the two-piece canopy are similar in size and shape. Both are five sided boxes having a base portion and four walls. The base of each portion may be of any shape but is typically rectangular. Typically, the base of one portion is slightly smaller than the base of the other portion so that the smaller portion may fit within the larger portion in order to provide a completely closed box in which to contain the electrical connections between the wires in the ceiling and the wires of the exit sign.

In operation, the upper portion of the canopy is attached to a standard electric box in the ceiling and the electric wires coming from the electric box are pulled through an aperture in the upper portion of the canopy. Next, the lower portion of the canopy is attached to the exit sign and the wires of the exit sign are pulled through an aperture in the lower portion of the canopy. The upper and lower portions of the canopy are adapted to be connected together by the use of a dimple and dimple-socket arrangement or a post and post-hole arrangement with an established, preselected bias condition between the walls of the lower and upper portions of the canopy. The lower portion of the canopy is then connected to the upper portion of the canopy by snapping the two together so that the lower canopy portion and the exit sign connected thereto are hinged about the dimple socket or post and post hole arrangement from the upper canopy portion in an open position exposing the wires to be connected. With the exit sign in this position, the ceiling wires are spliced to the exit sign wires, and wire connectors are then connected to the spliced wires to cover the connection. The wires and the wire connectors are then folded to fit within the canopy and the canopy is pivoted about the hinged point into the closed position and can then be locked closed by any appropriate means.

It is, therefore, evident that a primary object of the present invention is to provide a method and cost effective apparatus that will enable one person, without assistance, to install an exit sign to an electric box in a ceiling. Additionally, an object of the present invention is to provide a method and apparatus that will accomplish the primary objective of the present invention in a highly cost-effective manner.

Another object of the present invention is provide a method and apparatus that will be safe to install and will be safe to use in a wide spectrum of operating conditions. A further object of the present invention is to provide a canopy for mounting an exit sign to the ceiling that will completely enclose the electrical connections between the ceiling wires and the wires of the exit sign but is yet easy to install and inexpensive to manufacture.

To this end, the invention includes a two-piece canopy to facilitate the mounting of the exit sign to the electric box in a manner which allows the installer to connect the wires while the exit sign depends from the electric box via the two-piece canopy, and to then close the canopy so that the electrical wires are contained within the closed canopy and the exit sign is secured to the ceiling.

Other objects and advantages of the present invention will become apparent from the following detailed description of the invention with reference being made to the accompanying drawings. First, a brief description of the drawings will follow.

DETAILED DESCRIPTION OF THE PREFERRED EMBODIMENT

Figure 1:
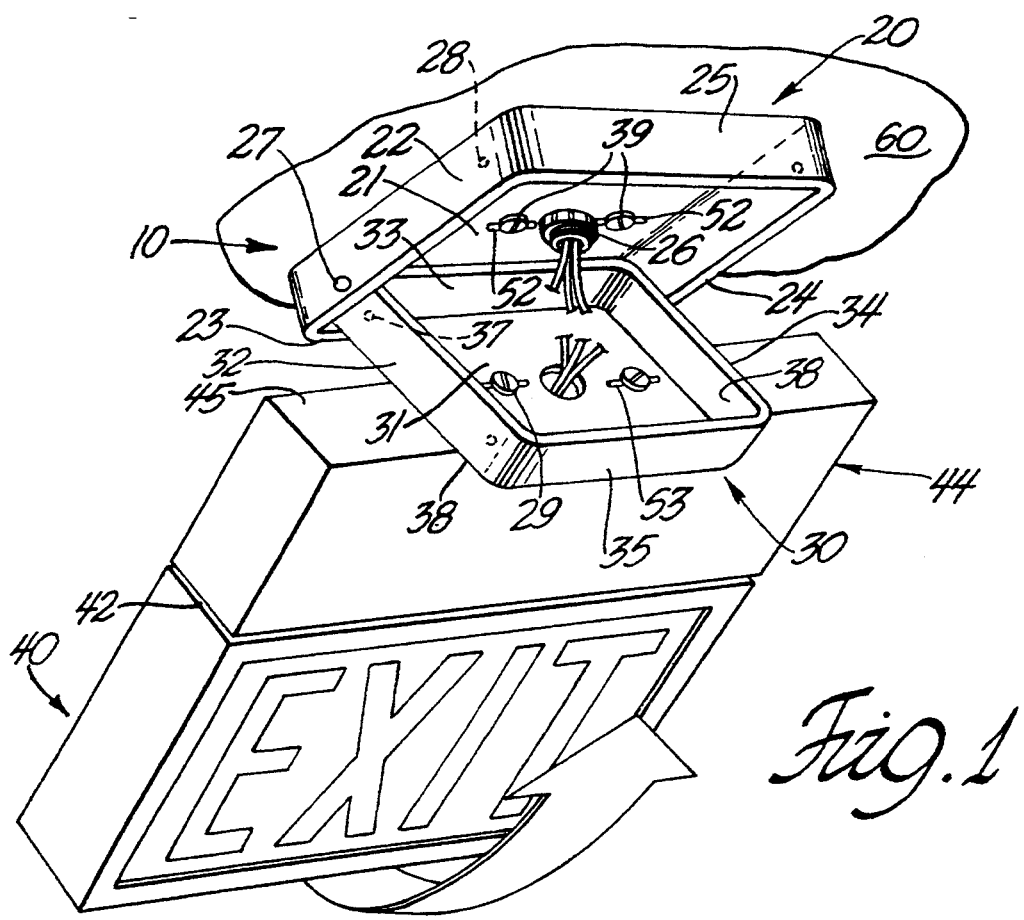
FIG. 1 is a perspective view of one embodiment of the invention, illustrating the two-piece canopy in the open position with the wires not shown to clearly illustrate the exit sign attached to the lower portion of the canopy.

Referring to the drawings, there is shown an exit sign 40 and power pack 44 mounted to an electric box 70 in a ceiling 60 using a two-piece canopy 10. FIG. 1 shows the two-piece canopy 10 in the open hinged position. The two-piece canopy 10 embodies an upper box portion 20 and a lower box portion 30. The two-piece canopy 10 is preferably made out of a strong lightweight material such as plastic or nylon in order to reduce weight and cost. However, the two-piece canopy 10 can also be made using metals, alloys, or other materials.

Figure 2:
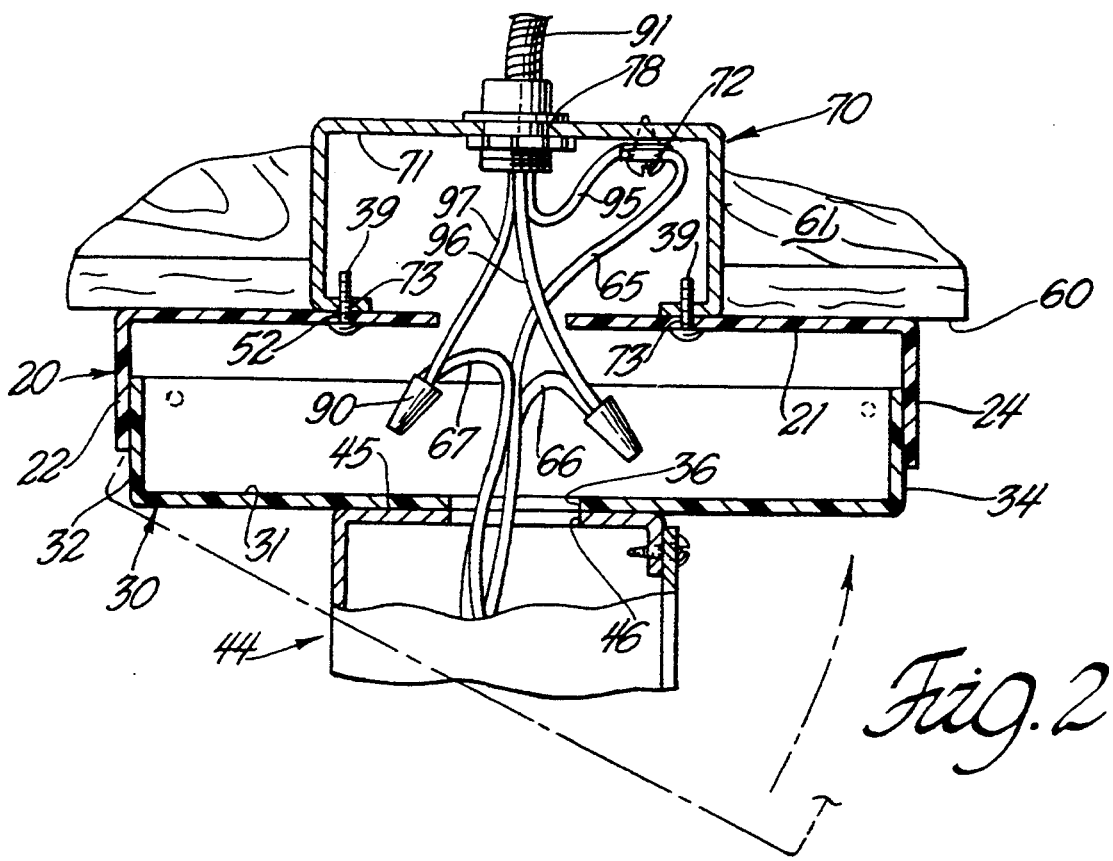
FIG. 2 is a side view of the two-piece canopy in the closed position, illustrating the attachment of the exit sign to the lower portion of the canopy and the attachment of the upper portion of the canopy to the electric box as well as the electrical wire connections.

FIGS. 1 and 2 show the upper box portion 20 mounted to the standard ceiling electrical box 70 by screws 39. The upper box portion 20 has a base portion 21 which is shown as being square in shape, but may be rectangular or another shape. The base portion 21 of the upper box portion 20 has a relatively large aperture 26 through which the leads of a ceiling wire 91 are passed. The base portion 21 also has slots 52 on each side of the aperture 26. The slots 52 are positioned to match up with standard threaded holes 73 of the standard ceiling mounted electrical box 70. The upper box portion 20 also has wall portions 22, 23, 24, and 25. Each wall portion is attached at an edge of the base portion 21. Thus, the base portion 21 and the wall portions 22, 23, 24, and 25 form a five-sided box.

The wall portions 22 and 24 constitute a first pair of opposing walls of the upper box portion 20, and the wall portions 23 and 25 constitute a second pair of opposing walls of the upper box portion 20. The wall portions 22 and 24 each have holes 27 and holes 28 or similar type orifice or slot located therein, with the hole 28 of the respective wall portions 22 and 24 being located at the end near the wall portion 25 and the hole 27 being located near the wall portion 23. The purpose of the holes 27 and 28 will be described hereinafter.

The lower box portion 30, shown in FIG. 1, is very similar to the upper box portion 20. The lower box portion 30 has a bottom 31 and four wall portions 32, 33, 34, and 35, each attached at an edge of the bottom 31, thereby forming a five-sided box. Each of these wall portions corresponds to the wall portions 22, 23, 24, and 25 of the upper box portion 20 but are smaller in overall size so that the lower box portion may be contained within the upper box portion. As with the wall portions of the upper box portion 20, the walls portions 32 and 34 constitute a first pair of opposing walls of the lower box portion 30, and the wall portions 33 and 35 constitute a second pair of opposing walls of the lower box portion 30.

The wall portions 32 and 34 each have holes 38 located in an end near the wall portion 35. The holes 38 are located on the wall portions 32 and 34 so that they will align with the holes 28 of the wall portions 22 and 24 of the upper box portion 20 when the lower box portion 30 is closed into the upper box portion 20.

Additionally, the wall portions 32 and 34 of the lower box portion 30 each have a post member 37 which is essentially an outwardly extending peg or peg portion or dimple extension located near the wall portion 33. The post members or dimple extensions 37 are located on the wall portions 32 and 34 so that they will align with the holes 27 of the wall portions 22 and 24 when the lower box portion 30 is inserted in the upper box portion 20. The holes or orifices 27 are provided for receiving the outwardly extending ember 37. Additionally, the post members 37 are located on the wall portions 32 and 34 of the lower box portion 30 in such a manner so that when the lower box portion 30 is attached to the upper box portion 20 the lower box portion 30 will pivot with respect to the upper box portion 20 and the wall portion 33 of the lower box portion 30 will clear the wall portion 23 of the upper box portion 20.

The overall depth of the lower box portion 30 is relatively smaller in size in the front to back direction (opposing walls 33 and 35) than the base portion 21 of the upper box portion 20 so that the wall portions 33 and 35 of the lower box portion 30 will fit within the wall portions 23 and 25 of the upper box portion 20 and permit pivoting of the lower box portion with respect to the upper box portion.

The opposing wall portions 33 and 35 are actually somewhat larger in distance apart than the opposing wall portions 23 and 25 of the upper box portion 20. This is necessary to establish a pre-bias condition between the upper and lower box portions so that when the two portions are assembled together a bias exists between these wall portions which provides for a force to maintain the hinging relationship described below.

Referring now to FIG. 2, the upper box portion 20 is shown mounted adjacent to the ceiling 60 through the use of the standard ceiling mounted electrical box 70 which has been installed in the ceiling 60. The ceiling wire 91 is generally brought into the electrical box 70 through a relatively large aperture 78 in the top of the electrical box. The ceiling wire 91 is made up of a ground wire 95, a first lead 96, and a second lead 97. The ceiling wire 91 is shown as a standard 110 volt wire. The ground wire 95 of the ceiling wire 91 is connected to a ground screw 72 of the electrical box 70 in order to ground the electrical box 70 and ultimately to ground the exit sign.

The upper box portion 20 is connected to the electrical box 70 through the use of the screws 39 inserted through the slots 52 in the upper box portion 20 and into the threaded holes 73 of the electrical box 70. The upper box portion 20 is mounted to the ceiling while the lower box portion 30 is connected to the exit sign 40. The bottom 31 of the lower box portion 30 has an aperture 36 located so that it will align with an aperture 46 in the top 45 of the power pack 44 or with a similar aperture located in the top 42 of the exit sign 40. Leads 66 and 67 and a ground wire 65 of the exit sign 40 are pulled through the aperture 46 in the top of the power pack 44 and the aperture 36 in the lower box portion 30. The bottom 31 has slots 53 which are positioned to line-up with holes in the top 45 of the power pack 44. The bottom 31 is connected to the top 45 through the use of screws 29 inserted through the slots 53 and the holes in the top 42 of the power pack 44.

Figure 3:
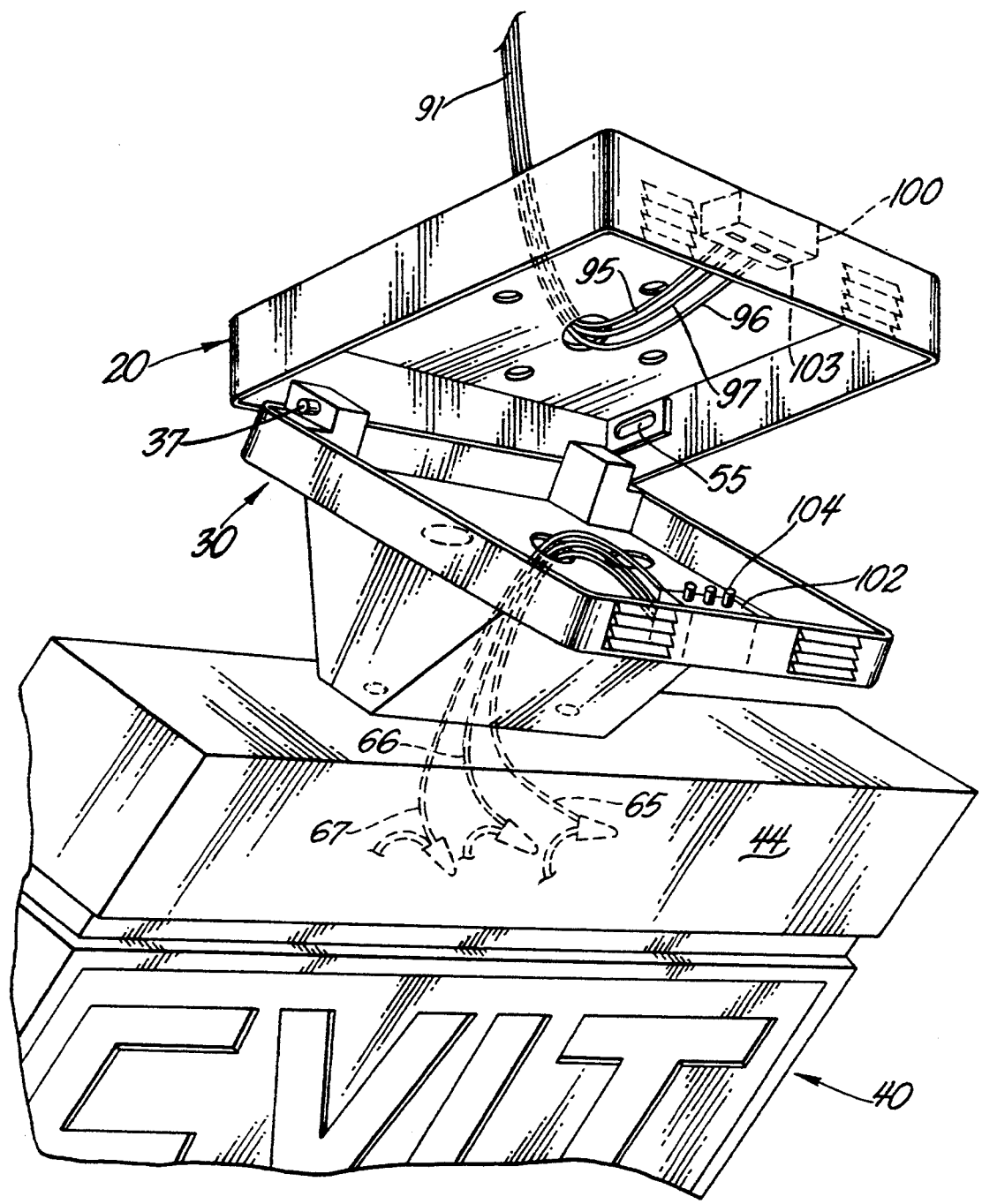
FIG. 3 is a perspective side view of an alternate two-piece canopy and exit sign mounted to a ceiling and showing the two-piece canopy in a partially open position, illustrating the use of a pre-attached electrical plug-in connector, made up of a male connector mounted in the lower box portion and a female connector mounted in the upper box portion, which is used to establish and break the electrical connection concurrently with the opening and closing of the two-piece canopy.

Once the upper box portion 20 is mounted to the ceiling 60 and the lower box portion 30 is mounted to the exit sign 40, the two portions can be coupled together. The lower box portion 30 may be connected to the upper box portion through the use of a snap together arrangement as shown in FIGS. 1 and 2 or by the use of post members mounted to the opposing walls 32 and 34 of the lower box portion 30 combined with the slots formed in the opposing wall portions 22 and 24 of the upper box portion 20 as shown in the embodiment of FIG. 3. In the embodiment of FIGS. 1 and 2, the lower box portion 30 is connected to the upper box portion 20 by inserting the outwardly protruding poet member or dimple extension 37 of the wall portions 32 and 34 in the holes 27 of the wall portions 22 and 24. First, the walls are gently squeezed together to fit the opposing walls 32 and 34 of the lower box portion 30 between the opposing walls 22 and 24 of the upper box portion 20. The lower box portion 30 is then further inserted into the upper box portion 20 until the outwardly protruding dimples snap into the holes 27 in the upper box portion 20 to establish a pivot about which the lower box portion and associated sign attached thereto can be suspended. At this point the lower box portion 30 depends from the upper box portion 20 in an open manner, and the ceiling wires and the exit sign wires are easily accessed to finalize the installation.

Once the exit sign is hanging through the use of the two-piece canopy other details may be attended to. It may be necessary to install bulbs in the exit sign 40, to clean the exit sign's surfaces, or to perform other maintenance on the battery or exit sign. All of this work can be carried out in a safe manner because the exit sign is being suspended through the use of the two-piece canopy. Once any maintenance is completed, the power to the exit sign and power pack must be connected.

The leads 96 and 97 and the ground wire 95 of the ceiling wire 91 can easily be spliced together with the corresponding leads 66 and 67 and the ground wire 65 of the exit sign 40. Standard wire connectors 90 are then used to cover the spliced wires. Once the wires have been spliced together the lower box portion 30 may be pivoted to close with the upper box portion 20 and then secured in place in any convenient manner such as with a self-tapping screw inserted in the hole 28 of the upper box portion and the hole 38 in the lower box portion which is in line with the hole 28 when the lower box portion is pivoted into the upper box portion. Alternatively, the lower box portion 30 may be secured closed through the use of the step and ratchet arrangement illustrated on the wall portions 25 and 35 of the alternate embodiment shown in FIG. 3.

FIG. 3 shows an alternative embodiment of the invention in which an electrical connector made up of a female member 100 and a male member 102 is used in conjunction with the two-piece canopy 10. The female member 100 of the electrical connector is attached to the base portion 21 of the upper box portion 20 and has receptacles 103 located therein. The male member 102 is attached to the bottom portion 31 of the lower box portion 30 and has prongs 104. The leads 96 and 97 and the ground wire 95 of the ceiling wire 91 are connected to the female member 100 in any convenient manner, and the leads 66 and 67 and the ground wire 65 of the exit sign 40 are connected to the male member 102 in any convenient manner.

In this embodiment, the ground wire 95 is also connected to the ground screw 72 of the upper box portion 20. The female member 100 and the male member 102 are located within their respective box portions such that when the lower box portion 30 is closed with the upper box portion 20 the prongs 104 of the male member 102 are inserted into the receptacles 103 of the female member 100 thereby completing a circuit between the ceiling wire 91 and the exit sign 40. When the lower box portion 30 is opened from the upper box portion 20, the circuit is broken and power to the exit sign will be cut off automatically so that it may be safely serviced.

The embodiment of FIG. 3 also illustrates an alternative to the dimple and socket arrangement shown in FIGS. 1 and 2 to establish a pivot about which the lower box portion can rotate with respect to the upper box portion. The upper box portion has slots or grooves in the opposing walls 22 and 24 while each of the opposing walls 32 and 34 of the lower box portion 30 has a post member protruding therefrom. As with the embodiment of FIGS. 1 and 2, the distance between the post members and the opposing walls 32 and 34 of the lower box portion is greater than the distance between the opposing walls 22 and 24 of the upper box portion 20 to establish a pre-bias between the upper and lower box portions. To attach the lower box portion to the upper box portion one of the post members in the lower box portion is positioned in the slot and the lower box portion is squeezed together until the other post member is moved between the opposing walls 22 and 24 of the upper box portion. The lower box portion is then moved into the upper box portion until the other post member snaps into the other slot or groove 55 of the opposing walls 22 and 24. At this point the lower box portion depends from the upper box portion and may pivot with respect thereto.

While the above described invention has been disclosed by way of a preferred embodiment, it is apparent that other forms of the invention could be adopted by one skilled in the art. For example, the upper box portion 20 and the lower box portion 30 may be made in varying shapes, or of shapes different than each other, and adapted to work with different fixtures. Additionally, other means for securing the lower box portion 30 to the upper box portion 20 may be used by one skilled in the art. Accordingly, the scope of the invention is to be limited only by the following claims.

What is claimed is:

1. An apparatus for connecting an exit sign to an electric box, said apparatus comprising:

an exit sign;

an upper box portion having a base, a first pair of opposing walls connected to said base and a second pair of opposing walls interposed with said first pair of opposing walls;

means for mounting said upper box portion to said electric box, said upper box portion mounting means being integral with said base of said upper box portion;

a lower box portion having a bottom, a first pair of opposing walls connected to said bottom, and a second pair of opposing walls interposed with said first pair of opposing walls of said lower box portion to form a box enclosure, said loser box portion being substantially complementary with said upper box portion;

means for mounting said lower box portion to said exit sign, said lower box portion mounting means being integral with said bottom of said lower box portion;

means for removably connecting said lower box portion to said upper box portion, said removable connecting means being integral with both said upper and lower box portions, said means for removably connecting further comprising an outwardly extending member located on a first and a second wall of said first pair of opposing walls of said lower box portion; and an outwardly extending dimple-socket located on a first wall and a second wall of said first pair of opposing walls of said upper box portion for receiving said outwardly extending member of said first and second wall of said first pair of opposing walls of said lower box portion, respectively, whereby when said outwardly extending member of said first pair of opposing walls of said lower box portion are mounted in said outwardly extending dimple-sockets of said first pair of opposing walls of said upper box portion said lower box portion and attached exit sign can pivot with respect to said upper box portion; and means for securing closed said lower box portion to said upper box portion such that one of said upper and lower box portions is substantially contained within the other to create a box secured shut by said securing means.

2. The apparatus of claim 1 wherein said means for securing said lower box portion to said upper box portion comprises:

means for biasing said lower box portion whereby when said lower box portion is pivoted shut with respect to said upper box portion said biasing means causes a pressure fit between said lower box portion and said upper box portion.

3. The apparatus of claim 1 wherein said means for securing said lower box portion to said upper box portion comprises:
   a hole in said first wall of said first pair of opposing walls of said upper box portion; and
   self-tapping screw thread means mounted in said hole, said screw thread means being adapted to engage said lower box portion to hold said upper box portion and lower box portion together.

4. The apparatus of claim 3 wherein said base portion of said upper box portion is rectangular in shape, and said bottom portion of said lower box portion is rectangular in shape.

5. The apparatus of claim 3 wherein said base portion of said upper box portion is square in shape, and said bottom portion of said lower box portion is square in shape.

6. The apparatus of claim 1 wherein said two pairs of opposing walls of said lower box portion comprise a first pair of opposing walls and a second pair of opposing walls interposed said first pair of opposing walls to form a box enclosure; said two pairs of opposing walls of said upper box portion comprise a first pair of opposing walls and a second pair of opposing walls interposed with said first pair of opposing walls to form a box enclosure; and wherein said means for removably connecting said lower box portion to said upper box portion comprises an outwardly extending peg located on a first and a second wall of said first pair of opposing walls of said lower box portion; and an outwardly extending dimple-socket located on a first wall and a second wall of said first pair of opposing walls of said upper box portion for receiving said outwardly extending peg of said first and second wall of said first pair of opposing walls of said lower box portion, respectively, whereby when said outwardly extending pegs of said first pair of opposing walls of said lower box portion are mounted in said outwardly extending dimple sockets of said first pair of opposing walls of said upper box portion said lower box portion can pivot with respect to said upper box portion.

7. The apparatus of claim 6 wherein said means for securing said lower box portion to said upper box portion comprises:
   means for biasing said lower box portion whereby when said lower box portion is pivoted shut with respect to said upper box portion, said biasing means causes a pressure fit between said lower box portion and said upper box portion.

8. The apparatus of claim 6 wherein said means for securing said lower box portion to said upper box portion comprises:
   a hole in said first wall of said first pair of opposing walls of said upper box portion; and
   self-tapping screw thread means mounted in said hole to hold said lower box portion to said upper box portion.

9. The apparatus of claim 8 wherein said base portion of said upper box portion is rectangular in shape, and said bottom portion of said lower box portion is rectangular in shape.

10. The apparatus of claim 8 wherein said base portion of said upper box portion is square in shape, and said bottom portion of said lower box portion is square in shape.

11. The apparatus of claim 1 wherein said means for removably connecting said lower box portion to said upper box portion comprises:
   oppositely aligned holes each located in a first and second wall, respectively, of said first pair of opposing walls of said lower box portion;
   a first and second post member each located, respectively, in one of said oppositely aligned holes of said lower box portion;
   a first orifice for receiving said first post member located in said first wall of said first pair of opposing walls of said upper box portion; and
   a second orifice for receiving said second post member located in said second wall opposite said first wall of said first pair of opposing walls of said upper box portion; and
   whereby said first and second post members are located in said first and second orifices, respectively.

12. The apparatus of claim 11 wherein said first orifice is a slot.

13. The apparatus of claim 11 wherein said first and second orifices are slots.

* * * * *

UNITED STATES PATENT AND TRADEMARK OFFICE
CERTIFICATE OF CORRECTION

PATENT NO. : 5,376,020
DATED      : December 27, 1994
INVENTOR(S): John E. Jones It is certified that error appears in the above-indentified patent and that said Letters Patent is hereby corrected as shown below:

Column 5, line 45, delete "ember" insert ---- member ----.

Column 6, line 46, delete "poet" insert ---- post ----.

Column 8, line 28, delete "loser" insert ---- lower ----.

Signed and Sealed this

Seventh Day of March, 1995

*Attest:*

BRUCE LEHMAN

*Attesting Officer*       *Commissioner of Patents and Trademarks*